(12) United States Patent
Kvisgaard et al.

(10) Patent No.: US 6,712,221 B2
(45) Date of Patent: *Mar. 30, 2004

(54) METHOD AND APPARATUS FOR WEIGHT CONTROLLED PORTIONING OF ARTICLES HAVING NON-UNIFORM WEIGHT

(75) Inventors: Thorkild Kvisgaard, Hinnerup (DK); John Bomholt, Hinnerup (DK)

(73) Assignee: Scanvaegt A/S, Aarhus N (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/379,511

(22) Filed: Aug. 23, 1999

(65) Prior Publication Data

US 2003/0094404 A1 May 22, 2003

Related U.S. Application Data

(63) Continuation of application No. 09/379,511, filed on Aug. 23, 1999, which is a continuation-in-part of application No. 08/809,492, filed as application No. PCT/DK95/00369 on Sep. 15, 1995, now abandoned.

(30) Foreign Application Priority Data

Sep. 15, 1994 (DK) .............................. 1058/94

(51) Int. Cl.⁷ .................................. B07C 5/16
(52) U.S. Cl. .................. 209/645; 209/592; 209/650; 209/657; 177/25.11
(58) Field of Search ................. 209/645, 592, 209/650, 657; 177/25.11, 25.12, 25.13, 25.18, 25.19, 116, 119, 145

(56) References Cited

U.S. PATENT DOCUMENTS

| | | | |
|---|---|---|---|
| 3,974,888 A | * | 8/1976 | Murakami et al. ...... 177/122 X |
| 4,206,822 A | | 6/1980 | Mazzucchelli ........... 177/25.18 |
| 4,313,507 A | | 2/1982 | Hays ............................. 177/1 |
| 4,388,975 A | * | 6/1983 | Hirano .................... 209/592 X |
| 4,418,772 A | | 12/1983 | Fukuda .................... 177/25.18 |
| 4,428,179 A | | 1/1984 | Jordan et al. ............... 177/50 |
| 4,442,910 A | | 4/1984 | Mikami .................... 177/25.18 |
| 4,482,061 A | * | 11/1984 | Leverett ..................... 209/592 |
| 4,508,186 A | | 4/1985 | Sashiki et al. ........... 177/25.18 |

(List continued on next page.)

FOREIGN PATENT DOCUMENTS

| | | |
|---|---|---|
| EP | 0 065 820 | 12/1982 |
| GB | 2116732 | 9/1983 |
| WO | WO 83/02002 | 6/1983 |

*Primary Examiner*—Donald P. Walsh
*Assistant Examiner*—Jonathan R Miller
(74) *Attorney, Agent, or Firm*—Nixon Peabody LLP; David S. Safran (57) ABSTRACT

A batching of currently supplied articles with non-uniform weights into portions of a uniform target weight is effected by passing the articles through a weighing station (6, 8) to a distribution system (12), in which the articles (4) are selectively allocated to a plurality of receiver bins (14). It is known to improve the capacity of such a system by way of probability calculations based on the normal distribution of the articles in the supply flow, but according to the invention it is still better to base such calculations on a regularly updated recorded histogram (28) of the weight distribution of a relatively high number of newly weighed articles. Thereby the target calculations will rely on factual rather than just expected conditions, and a very important result is that it is possible to effect relevant batching even when the article weights in the supply flow are not normally distributed.

8 Claims, 4 Drawing Sheets

U.S. PATENT DOCUMENTS

| | | |
|---|---|---|
| 4,632,254 A | 12/1986 | Scopatz |
| 4,642,788 A | 2/1987 | Haze ........................ 177/25.18 |
| 4,836,310 A | 6/1989 | Yamano |
| 5,074,436 A | 12/1991 | Inoue ........................ 177/25.18 |
| 5,084,832 A * | 1/1992 | Yamada et al. ...... 177/25.18 X |
| 5,270,495 A | 12/1993 | Mosher et al. ............ 177/25.18 |
| 5,319,160 A | 6/1994 | Nambu ..................... 177/25.18 |
| 5,719,355 A | 2/1998 | Nishimura ................ 177/25.18 |
| 5,760,342 A | 6/1998 | Takeda et al. ............ 177/25.18 |
| 5,998,740 A * | 12/1999 | Kvisgaard et al. ........ 177/25.18 |
| 6,151,866 A | 11/2000 | Connell |

* cited by examiner

FIG. 9   $P_{TM1}(g)$ PROBABILITY FUNCTION FOR ONE MISSING PART.

FIG. 10   $P_{TM2}(g)$ PROBABILITY FUNCTION FOR TWO MISSING PARTS

FIG. 11   $P_{TM3}(g)$ PROBABILITY FUNCTION FOR THREE MISSING PARTS

Fig. 12

METHOD AND APPARATUS FOR WEIGHT CONTROLLED PORTIONING OF ARTICLES HAVING NON-UNIFORM WEIGHT

This application is Continuation-In-Part of co-pending U.S. patent application Ser. No. 08/809,492, filed Mar. 17, 1997.

BACKGROUND OF THE INVENTION

1. Field of the Invention

In the food processing industry it is a well known problem that it is difficult to obtain portions consisting of a number of parts (such as pieces of fresh or frozen fish, meat or poultry) when it is additionally required that a predetermined precise portion weight (possibly with tight tolerances) be combined with a pre-determined number of pieces, in particular in those cases where the weight of the individual pieces deviates in such a manner that the weight distribution of the pieces is non-normal or changing. Portions having a fixed number of pieces or a number in a chosen interval may be aimed at.

A weight distribution may be normal, whereby the usual concepts 'average and spread' may be used as well as well tested statistical calculation procedures. The weight distribution may also be non-normal, because of the fact that the charge or flow of material being weighed may, at an earlier stage, already have been subjected to sorting and possible removal of all items within certain weight intervals, and this will have removed the possibility for traditional statistical calculations.

2. Description of Related Art

Known methods to obtain portions of the kind discussed comprise manual weighing which is a very stressful activity and in most cases the built-in security for the customer in the form of over-weight means a considerable loss for the manufacturer.

Two principally different automatic methods are known: The combination weighing principle and the accumulation weighing principle. In the first, a number of weighed parts or part portions are disposed in a number of weighing bins or in the combination bins of such weighing bins, whereupon, based on the part weights measured, a computer calculates which bin sub portions in combination will constitute the portion which is closest in weight to the predetermined target weight. The limitation of this method is in particular that the number of parts which is available for the combination is limited. In particular when the individual weights of the parts deviate, possibly considerably from each other (as in the case of fish, poultry, or meat) the combinations will often deviate more than is desirable from the target weight, and this will, as in the manual case, mean a loss for the manufacturer.

In the accumulation weighing principle several full portions are currently and even concurrently built up. The individual parts are conveyed forward in a line and are weighed on a dynamic weigher, and the weights are registered successively by a computer which hence keeps track of the relative position in the line and the respective weights. A distribution unit places the parts selectively in collecting bins, whereby the portions are built up, while the accumulated weights of parts in the individual bins are registered in the computer. The allocation of the individual parts to the various bins continues as long as the accumulated weight in the bin is still below the target weight, until, finally, the bin waits for a part which in the particular portion would just bring the portion weight to the desired value. In order to achieve a reasonable capacity one will have to accept that it may become necessary—and even standard practice—to perform the last discharge with a part which will give an overweight to the portion because it will be an almost lucky coincidence if among the arriving and already weighed parts there will be one which will provide the precise desired total weight.

In the last mentioned method a noticeable improvement has been achieved, cf. GB-C-2,116,732, in that based on a qualified estimate of the freight distribution in the mass of parts one causes a selective sorting out in such a manner that parts with a weight above and below the average, respectively, are brought together to make part portions which in order to fill to the desired weight need only one or a few parts which have the average weight. The method hence is based on the probability consideration that, of the normal distribution, there will be the largest number of those parts which have the respective average weight, whereby the final filling of the portions may occur the fastest when the waiting is for parts of in particular this group.

This method is quite advantageous, once it has been ascertained beforehand, by sampling, what the average weight of the parts is, and in which weight range the parts occur, i.e. what the so-called spread is. The current calculations, based on a preprogrammed normal distribution curve, may be performed with limited data (equipment, a.o. because according to normal practice one may allow that a new part may simply be fed to the first of such part portions which waits for a part in the weight class represented by that part, even though, as will be discussed below, the part might have been placed more appropriately in another of these part portions.

However, it has been realized in practice that certainly within the area of the food industry dealt with here it is difficult to retain the knowledge about the weight distribution in the mass of parts as both the average weight and the spread may fluctuate between e.g. different loads of raw material. Furthermore it is in connection with the present invention considered that it may be desirable to create particular assortments from a given mass of parts which would completely change the image of the distribution of the mass which is available for the creation of the portions discussed. As an example, the removal of in particular those parts which have the average weight may entail that there will be no parts available for the conclusion of the portions according to the method described above.

It is a well known practice that a charge is sorted beforehand, e.g. by taking out particular qualities. The portioning equipment could be better utilized if this sorting occurred in conjunction with the portioning, but with the associated deliberate change in the part weight distribution the remaining parts usable for the portioning will no longer ex-hibit the normal distribution. In this way a sorter or batcher of the said known type is given a task which it is not suited to solve. If it is desired in the industry to work with parts which are reliably present in a normal distribution the raw materials are more expensive which again gives a more expensive finished product.

SUMMARY OF THE INVENTION

The present invention relates to a method for portioning which uses certain aspects of the accumulation weighing principle but which makes it possible to distribute the individual parts to the various collection bins for the building of portions essentially independently of the weight distribution of the product parts.

It is a modern trend in the food industry that raw materials are processed one way or the other to a still increasing extent. The raw materials as delivered to the processing industries could well exhibit a normal distribution, but over time it has been a steadily increasing problem that the processed materials, which are to be packed or batched, are no longer normally distributed. Thus, it has been practically impossible or rather expensive to effect batching to a specific target weight and therewith to a fixed price of the packings. Instead, it has become a common practice to batch desired numbers of articles, e.g. four cutlets, and to weigh the individual packings as a basis for an automatic printing of weight and price or associated labels. This technique is fairly simple, but for different reasons all the links in the chain from the processing factory over wholesalers and retailers to customers would in fact prefer packings of fixed weights and prices.

Also, there are special types of packings, which could be good candidates for a "batching to predetermined weight", even without this having crossed the minds of the relevant experts because an automatic batching would seem completely impossible. As an example, it is a well known practice that cheese manufacturers may produce not only whole cheeses, but also larger and smaller pieces of such cheeses, each packed and stamped with weight and price; in this area it is a fully established and preferred practice that the customers can choose between many different piece sizes, inasfar as the pieces will be consumed over a much longer period of time than will four cutlets. Here, the merchandise is one piece only, and that could seem impertinent for the invention. However, in the said chain these pieces are not delivered one by one, but collected in boxes, and typically a retailer will receive one or more boxes with cheese pieces, all ready packed and price marked. In this picture, a potential possibility is that the sender of the box, be it a wholesaler or a manufacturer, could batch the different pieces into the box up to a specific target weight, whereby there would be no need to arrange for a weighing of the filled boxes nor for any accounting for the summed-up weights of the relevant pieces. In many instances, however, this has been practically impossible so far, particularly when pieces of a specific weight have been sorted out, because the pieces to be batched will not, then, exhibits any kind of natural distribution. Any attempt of making such a batching economical based on expectations as to a normal distribution would be completely fruitless, and no other usable methods or means have been disclosed so far.

According to the present invention it has been realized that whatever the starting conditions are, the first higher number of individually weighed articles will be indicative of some factual weight distribution, which can be assumed to be maintained in the future, until factual observations may render it clear that there is some change in the general weight distribution. On this background it is proposed by the invention to arrange for a control unit keeping track of the weights of a plurality of previous articles for determining the factual weight distribution of the received articles. Based thereon, it is possible to statistically calculate the probability of newcoming articles to fit into the already partly established portions, and it has been found that in using the calculation results methodically for diverting the articles to portions selected in this manner, many batching jobs with non-natural article distribution can be effected with a surprisingly high efficiency.

Obviously, conditions may occur under which it would not be feasible to arrange for a batching as here discussed, e.g. if the actual articles are too awkwardly distributed for aiming at any reasonable target weight. In such cases of doubt it will be possible to carry out a test weighing of the article flow and run a simulated batching program, whereby it can be ascertained how successful a batching would be, if arranged for. Under circumstances it could even be found by subsequent analyses that an automatic batching would be feasible if another target weight was chosen or if adjustments were made to affect the weight distribution in some weight range.

As an opposite extreme it has been found that the use of the invention for the batching of normally distributed articles for a variety of distributions seems to give still better results than the said known method. However, it is still the possibility of handling articles with pronounced non-normal weight distribution which is the major aspect of the present invention.

With the invention it has been realized that with the use of a more advanced data processing system it is possible to currently create a specific picture of the factual weight distribution without relying on any predetermined or preexpected distribution curve based on general statistics. According to the invention the weights of the incoming and currently weighed parts ace methodically registered in a serial register basically of the FIFO type (First In, First Out), such that the different weights of a representative number of consecutive parts, for example the latest 50–500 parts, are recorded in such a manner that it is possible to form a histogram or a similar representation of the number of parts located within respective narrow weight ranges, e.g. 5 g as pertaining to an acceptable overweight of 10 g and an acceptable underweight of 5 g. The general picture of the weight distribution may well be rather confuse compared to some standard distribution curve, but at each moment of time it will be notorious that the last plurality of parts was weight distributed according to the said histogram. There is reason to believe, therefore, that even the following parts parts will be equally weight distributed, and the following computations may be based on that expectation.

However, should the factual weight distribution undergo a change for any reason, be it an initiated picking out of all parts of one or more specific weight ranges or a general shift of the material supply to another source of supply, the characteristic distribution histogram will soon adjust itself to the changed situation, such that it will steadily be reasonably representative for the incoming parts, fully independently of statistical norms of distribution. Thus, the histogram may clearly reflect e.g. the absence of all parts of a certain weight category, whether these parts are actually missing in the supply low or they are successively selected for separate collection in dedicated bins.

With the invention it is acknowledged that the basic philosophy of the said known method of taking advantage of the normal distribution curve is indeed advantageous, but it is also realized that it can be modified to achieve still better results, both generally and in particular whenever the factual distribution is remote from any natural standard. The normal distribution curve is a model of "expected probability", which holds only as long as the distribution really is normal, but according to the invention this is changed into a current analysis of "factual probability", based on the said histogrammic resolution of the observed weight distribution. Admittedly, the practical aspect of the invention is highly dependent of the use of modern computers that can be programmed to carry out such analyses at a minimum of time, but the invention is clear with respect to the underlying reaction criteria.

Based on the histogram it is easy to calculate the probability of the occurrence of parts in the individual weight groups, and it is correspondingly easy to determine which parts should be brought together in order to form a basic sub portion qualified to be completed with parts, not necessarily of any average weight, but otherwise being predominantly present in the supply flow in order to make up a portion of the desired total weight.

It is highly characteristic for the invention that the current results of the analyses can be used in two different ways, viz. for one thing in deciding for which bin or bins any new part will be suitable, and for another thing in deciding whether that particular part is suited better for one than for others of these bins, instead of the conventional designation of the parts just to the first available recipient calling for or accepting a new part of a specific weight subrange.

For this operation it is required that the computer carries out a detailed analysis of the probabilities of each new part to be successfully added to each of the different bins, in view of the probability of forthcoming parts to fill up the portions to the target weight, derivable from the supply histogram.

This will be a matter of carrying out a series of well defined calculations at the delivery of each new part from the weighing station for rapidly determining the most relevant receiver bin for that new part, purely based on these probability calculations and not on any kind of general expectations. The computer, keeping current account of the fill-up requirements of the individual bins, should also keep track of the histogram of the incoming parts, but this will be a less urgent matter because a noticeable change of the weight of, say, 10–20 new parts will not essentially change the histogram of e.g. 200 preceding parts. It is of course important to register such changes, but for the computer capacity it is very advantageous that these changes should not necessarily be registered immediately. This may admittedly give rise to some less perfect calculations, but only during short periods of time, until a new histogram has been more or less stabilized.

The invention is not limited to the use of a single feeding line, nor to the use of a dynamic weigher. To a given sorter system may be connected several feeding lines, each with a weigher that may well require a dwelling time of the respective parts, and the computer equipment may be correspondingly adapted to handle infeed details from several sources so as to coordinate these details with the requirements of the various receiver bins. The determination of the weight of the parts may be effected by any appropriate means, thus also by a vision equipment.

BRIEF DESCRIPTION OF THE DRAWINGS

In the following the invention is described in more detail with reference to the drawing, in which.

DETAILED DESCRIPTION OF THE INVENTION

Figure 1:
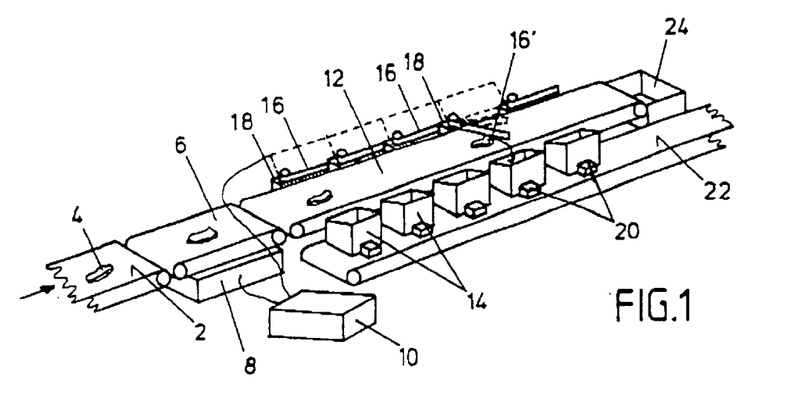
FIG. 1 is a general perspective view of a portioning machine, known per se, but operable to work in accordance with the present invention.

In FIG. 1 is shown a batcher system of a conventional mechanical lay-out. It comprises a feeder conveyor 2, on which parts 4 to be batched are conveyed one by one and brought to a conveyor 6 forming part of a dynamic weigher 8 registering in a computer 10 the weight of the single parts 4. Once weighed, the parts 4 are fed to a sorting conveyor 12 having at one side a row of receiver bins 14 and at the other side a corresponding row of diverter wings 16 with associated actuator units 18 operable to selectively swing the arms into a diverter position as shown at 16', in order to unload a given part 4 into a selected bin 14. The computer 10 controls the operation of the wings 16 so as to effect unloading of parts 4 of particular weights into selected bins, keeping track of the total contents of the individual bins.

All according to the programming of the computer 10 the operation may proceed as a sorting out of parts 4 to build up portions of parts of uniform weight classes or as a batching of parts of different weights in order to build up portions of a predetermined target weight, preferably even with a predetermined number of parts in each portion, e.g. as described in said GB-C-2,116,732.

Each of the bins 14 has an actuator 20 operable by the computer 10 to open a bottom gate of the bin for selectively dropping the finished portions to appropriate take-away means such as an underlying conveyor 22.

Parts 4 which will not fit in any of the bins 14 will proceed to the end of the conveyor 12 for delivery to a collector box 24 or any other receiver, potentially in order to be recirculated in the system.

The described general lay-out of a batching system will be perfectly applicable in connection with the pre sent invention, which is focussed on the programming of the computer or control unit 10 in order to provide for a highly improved performance of the batching system.

Figure 2:
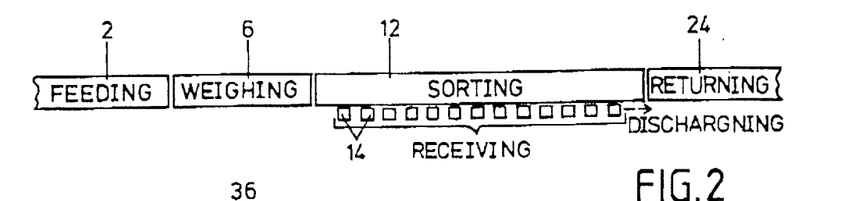
FIG. 2 is a function block diagram of the control system of the machine.
Figure 3:
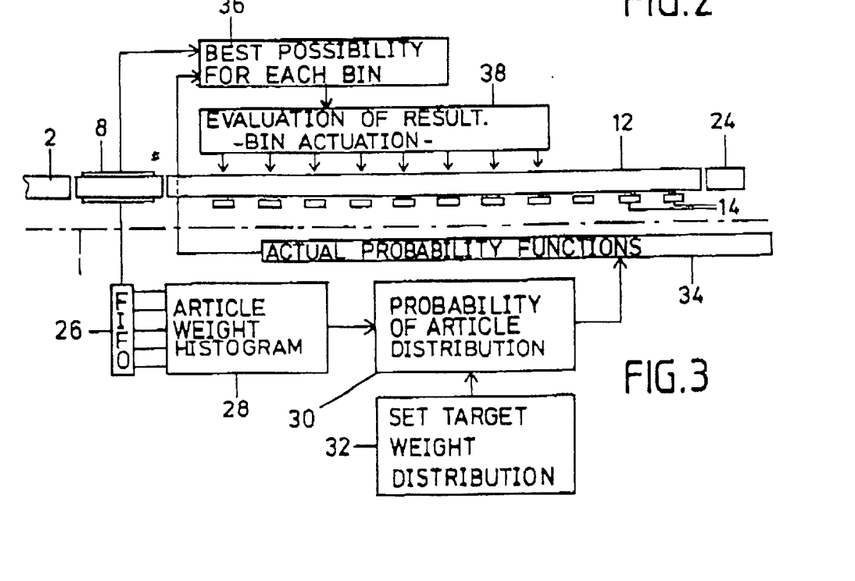
FIG. 3 is a corresponding view, with added function blocks of the control unit.

FIG. 2 shows the same system in blocks, and the same picture is refound in FIG. 3, which illustrates the invention in more detail, with added blocks indicative of the operation of the control unit 10. FIG. 3 a dotted line 1 divides these blocks in real time operations, above the line, and background operations below the line.

The consecutive results of the weighing of the arriving parts 4 are fed to a FIFO-register 26. After a while this register will hold information of the weighing results of as many parts 4 as desired, e.g. 50–300 parts. Based on this information it is possible, in a unit 28, to build up a histogram picture of the weight distribution of that amount of parts 4, e.g. as shown in FIG. 4.

Figure 4:
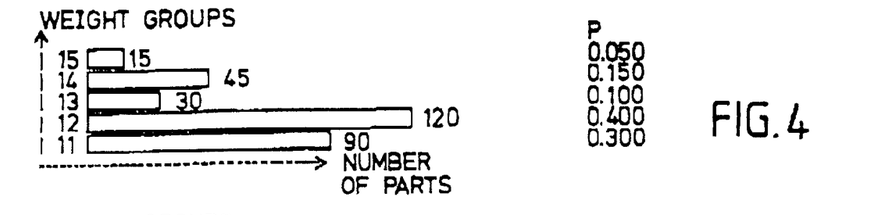
FIG. 4 is a representation of a histogram of the weight distribution of newly arrived and weighed parts.

In the example of FIG. 4 it is assumed that the FIFO-register 26 will hold 300 measuring results and that these are distributed as shown, indicated by number of parts in different weight groups or classes between 105 d (d=weight unit) and 154 d, the individual classes being defined as spanning over 10 weight units, here resulting in group 11 holding 90 parts of weights ranging from 105 to 114 d, group 12 holding 120 parts between 115 and 124 d, and so forth. Out of this histogram it is possible to calculate the probability of the weight of the next arriving part 4, assuming the same distribution, viz. by dividing the part numbers of the individual groups by the total number. In FIG. 4, the probability of the next part or parts to belong to each of the groups is listed under p, amounting from 5% for group 15 to 40% for group 12.

Based on these figures it is possible to calculate the probability function of the summed-up weight of two parts, now with groups ranging from 22 to 30, merely by multiplying the respective probabilities. However, the probability of two parts joining to a specific weight group will be increased to the extent there are more possibilities for such a formation. In the above example, while group 22 can only be formed by two parts from group 11 (with probability 0.3×0.3=0.09), group 23 can be formed by two different incidents, viz. either a part from group 11 following a part from group 12 or just the opposite. The probability of these incidents is the same (0.3×0.4=0.12, so the combined probability will be twice as high, i.e. 0.24.

Correspondingly, for the further groups there will be still further possibilities of combinations, thus for group 24 the three combinations 11+13, 13+11 and 12+12, amounting to a probability of 0.22. In statistics, of course, there are well established models and formulas that enable a rapid calculation of such combination possibilities or probabilities.

Figure 5:
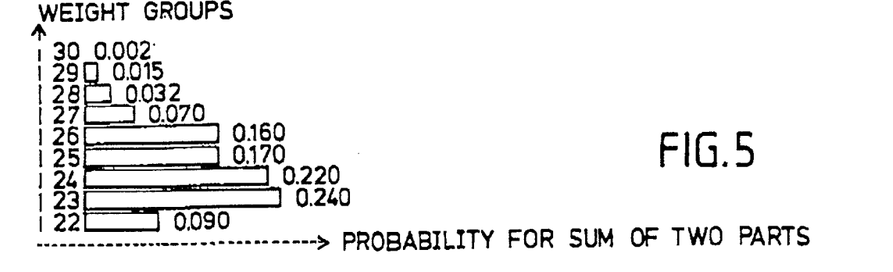
FIG. 5 is a representation of the probability of weight summation of two parts.
Figure 6:
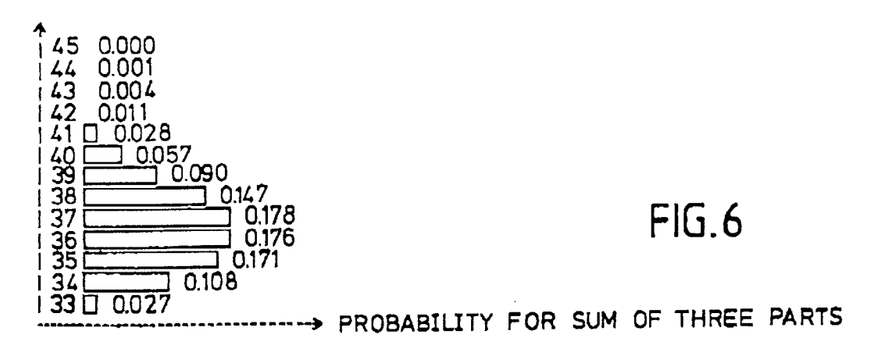
FIG. 6 is a similar representation relating to the joining of three parts.

FIGS. 5 and 6 illustrate the probability of combinations of two and three parts respectively, based on the histogram of FIG. 4.

These calculations are not usable in any direct manner for arriving at a desired target weight, but once a target weight has been chosen it is possible to use corresponding calculations for calculating backwards from the target weight and thus to determine the probability functions when there is lacking any increasing number of parts in the individual bins.

Figure 7:
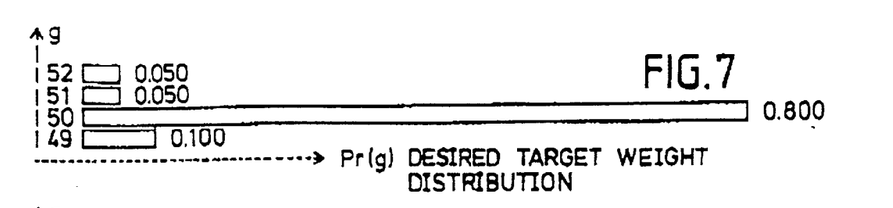
FIG. 7 is a corresponding representation of a target weight setting.
Figure 8:
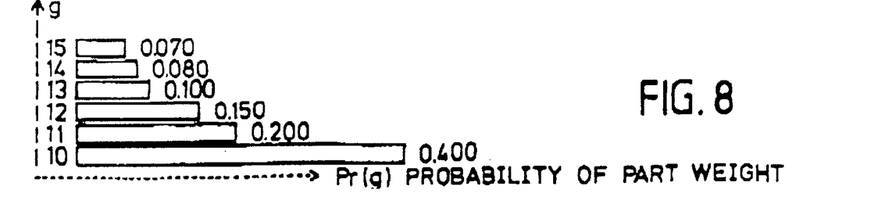
FIG. 8 is a similar representation of an associated weight probability function.

The desired target weight is set in a unit 32, typically with a certain target distribution such as shown in FIG. 7. According to that example, in which the figures are different from those of FIG. 4, it is desired to produce batches of a target weight of 500 d, with a tolerance between −10 d and +20 d for a limited number of batches, giving the target range 49–52. In this example the probability function of the part weight as derived from the histogram of unit 28 may be as shown in FIG. 8, here with the condition that it is desired to make use of parts from groups 10–15 only, i.e. parts of 95–154 d. Parts outside this interval may be automatically sorted out for other purposes, or they may have been removed beforehand.

Figure 9:
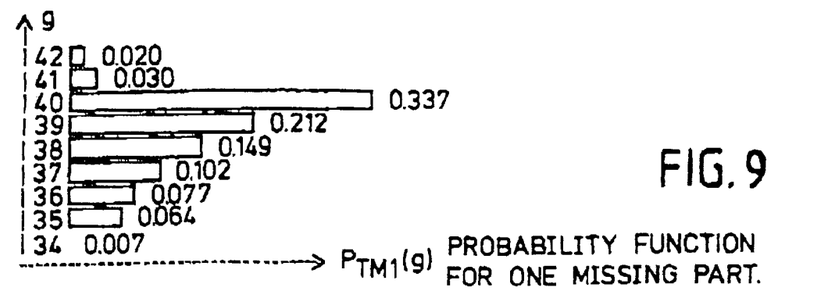
FIGS. 9–11 are representations of probability functions for missing one, two and three parts, respectively.

Based on diagrams corresponding to FIGS. 5 and 6 it is possible, as mentioned, to calculate in a unit 34, the general probability function for the parts to be able to fill up to the target weight when one part is missing, this function being shown in FIG. 9. Correspondingly, FIGS. 10 and 11 show the functions when two and three parts are missing, respectively.

For further explanation, although it will be trivial to statistical experts, FIG. 9 will be representative of a partial portion made of four pieces and missing one piece. Any bin hereby holding a sum weight of group 40 will have maximum probability (0.337) to reach the target weight range according to FIG. 7 since, as apparent from FIG. 8, pieces of weight group 10 are predominant in number. On the other hand, a bin having reached weight group 34 will have a very low probability (0.007) of coming up to the target weight and even only up to the acceptable underweight range, because in order to land at weight group 49, its only possibility is to wait for a piece from the maximum weight group 15, of which only very few can be expected.

Since according to FIG. 7 only 10% of the target portions are allowed to exhibit the acceptable small underweight, the computer should also keep account of the allowability of finishing an underweight portion, inasfar as the previous batching history will of course be decisive for such an allowability decision, based on the said 10%, measured for example over the last 1000 batches.

Figure 10:
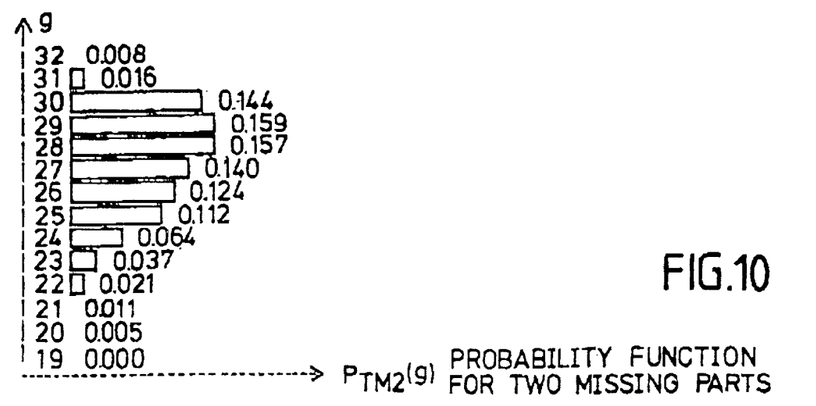
Figure 11:
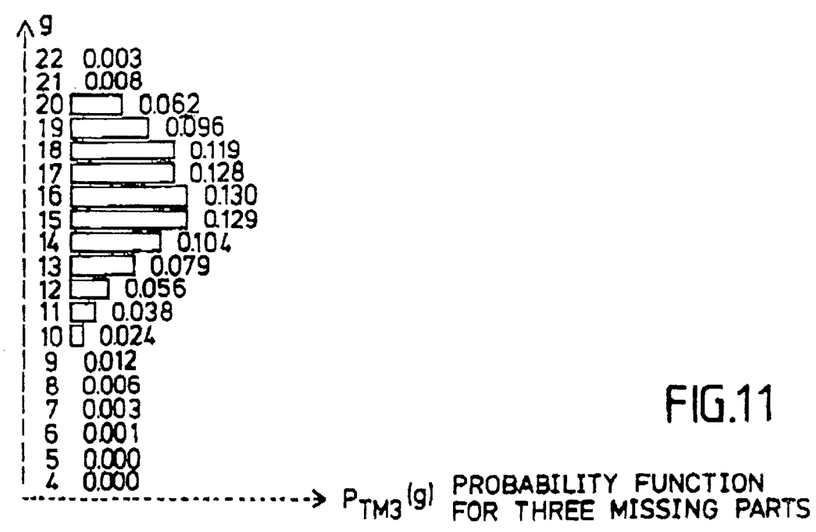

As another example, if a bin has already collected three pieces to the sum level 26 as appearent from FIG. 10, this bin will now be missing two parts, and of course there will be several combination possibilities available for two pieces to join into the missing weight groups of FIG. 7. Thus, a first piece from the extreme upper weight group 15 will require a second piece from weight group 11 in order to land at the permissible overweight group 52 (26+15+11=52), or, of course, it could be allocated a first piece of weight group 11 and then a second piece of weight group 15, amounting to the same result. However, having a first received a piece of weight group 25, it could still better be allocated a final piece of the minimum weight group 10, this amounting to practically the same result, though now in overweight target group 51, but with an increased probability because there are more pieces available in group 10 than in group 11. It would of course be ideal if a last piece of group 9 could be selected, as this would enable the reaching of the ideal target weight of group 50 (FIG. 7), but according to the example, pieces of this weight group are simply not available.

In more general, the remaining two pieces for building up of a full target portion from stage 26 in FIG. 10 may be combined by parts from several of the available part weight ranges according to FIG. 8. This leads to the said backwards calculations, turning (26+15+11=52) into (52−15−11=26). Thus, for the stage 26 of FIG. 10, it is relevant to operate with a probability function given by the sum of the following twenty combination possibilities, these being listed with their respective probability values (FIG. 8):

| | | |
|---|---|---|
| 1. | 52 − 15 − 11 = 26 | 0.05 × 0.07 × 0.02 = 0.0007 |
| 2. | 52 − 14 − 12 = 26 | 0.05 × 0.08 × 0.15 = 0.0006 |
| 3. | 52 − 13 − 13 = 26 | 0.05 × 0.10 × 0.10 = 0.0005 |
| 4. | 52 − 12 − 14 = 26 | 0.05 × 0.15 × 0.08 = 0.0006 |
| 5. | 52 − 11 − 15 = 26 | 0.05 × 0.20 × 0.07 = 0.0007 |
| 6. | 51 − 15 − 10 = 26 | 0.05 × 0.07 × 0.40 = 0.0014 |
| . | | |
| . | | |
| . | | |
| 11. | 51 − 10 − 15 = 26 | 0.05 × 0.40 × 0.07 = 0.0014 |
| 12. | 50 − 14 − 10 = 26 | 0.80 × 0.08 × 0.40 = 0.0256 |
| 13. | 50 − 13 − 11 = 26 | 0.80 × 0.10 × 0.20 = 0.0160 |
| . | | |
| . | | |
| . | | |
| 16. | 50 − 10 − 14 = 26 | 0.80 × 0.40 × 0.08 = 0.0256 |
| 17. | 49 − 13 − 10 = 26 | 0.10 × 0.10 × 0.40 = 0.0040 |
| 18. | 49 − 12 − 11 = 26 | 0.10 × 0.15 × 0.20 = 0.0030 |
| 19. | 49 − 11 − 12 = 26 | 0.10 × 0.20 × 0.15 = 0.0030 |
| 20. | 49 − 10 − 13 = 26 | 0.10 × 0.40 × 0.10 = 0.0040 |

0.1242
(FIG. 10, "26")

While it is an important aspect of the invention that the batches can be built up to a fixed weight and number of parts, it will also be possible to aim at a target weight by a non-fixed number of parts.

Thus, if a bin holds a sum weight, which makes it possible to reach the target by means of different choices of number of missing parts, and more than one of these choices will not violate restrictions for total number of parts, the probabilities for the possible choices can be added. For example, FIGS. 10 and 11 shows that target can be reached from a sum weight of group 20 by means of 2 parts as well as by means of 3 parts. To take both choices into account, the values for group 20 can be summed, thus representing the possibility of finishing by means of either 2 or 3 parts. It can then be evaluated which of these choices should be preferred.

The first part for each bin can be selected rather uncritically, because at that time there will be many possibilities for filling up to the desired number at target weight, e.g. to ten parts.

It could even be possible to start with a low number of random parts, the computer 10 keeping account of the total weight in each of the bins. At some level, however, a unit 36 starts comparing the actual weight in each bin, when a known number of parts is missing, with the relevant probability function as provided be the unit 34 (confer FIGS. 8–10). This can be done in the manner that it is calculated, for each bin, how an allocation of the new part for that bin would affect the probability of the bin to thereafter be successfully filled to target weight, IF the part be delivered to that bin. In a unit 38 it is evaluated, according to preset criteria, whether the new part should be allocated to the bin in which the remaining probability for a successful target filling will then rise to a maximum compared with the corresponding probabilities for all of the other bins, or whether the preferred bin should be the one in which the individual probability will enjoy the biggest increase (or, respectively, the smallest decrease). Also, it can be decided that the new part will not fit adequately in any of the bins, whereby it is rejected and moved for recirculation if not usable otherwise.

The signal processing in that part of the system should be in real time, while the units 28, 30 and 34 will only need updating from time to time, as the basic histogram may change, e.g. after the weighing of each 50 new parts.

It will be appreciated that the required calculations are based on the factual histogram. It will be understood however, that for some operations the histogram may still be effectively factual, even if based on a detection of the weight of e.g. every second or third arriving article. For the operation as such it will make no difference if, for example, the high proportion of parts of some average weight is not present at all or only in a very low proportion. The system will operate perfectly well anyway with all the remaining parts.

There are many possibilities of refining the system according to special desires, of which only a few should be mentioned here. Thus, it may happen that a given bin 'stops', should it be unlucky to steadily be rejected in favour of other bins; if it is desired that all bins should be in regular operation it is possible to add an artificial, small 'additional probability' to any stopped bin and even to increase this addition in time, in order to 'push' the bin into operation, still with a fair probability of becoming filled to target weight.

Of course, the computer 10 can easily keep track of the average weight of the delivered portions, and it can be adjusted such that in case of a negative tolerance on the target weight it will ensure that the average batch weight will not at any time be lower than the target weight itself, this being demanded from many industries; the individual probability functions can be adjusted to prevent batching results giving rise to such a lowering.

The method is perfectly usable for carrying out two or more jobs at the same time, with different target weight distributions and even with graduated priorities. The computer, of course, should have the required increased capacity.

According to another aspect of the invention it has been found possible to use the grader technique for "mixed jobs" or "multi product batching" such as a co-batching of different chicken parts in the individual batches, typically two pieces of breast, drumsticks, thighs and wings, respectively, up to a specific target weight (target weight range or target weight distribution). Each chicken may end up in two of each such pieces, and it would be easy to pack a parted chicken in a packing containing these eight main parts thereof. However, the chickens and therewith these respective main parts thereof are not all of the same weights, and generally it would be attractive if such packings could be sold at fixed weight and price. Sporadically, this has lead to attempts of merging pieces from one chicken with other pieces from other chickens in order to arrive at portions with a fixed standard weight, for enabling a uniform price marking, but this is a matter of careful or lucky "manual selection" which, averagely, is highly time consuming and extremely likely to result in a considerable overweight ("give-away") if or when it is prescribed that any underweight should be avoided. As the chicken parts come by on a conveyor and weighing line, the operator(s) will have very little time to decide between placing the newcoming articles in one or another of the already initiated portions. At the principal level, however, it becomes possible to make use of parts of chickens of both overweight and underweight, when the different pairs of different categories are joined in portions of an average target weight, despite the normally arising high degree of giveaway.

The batching technique by means of a grader has been developed for the handling and batching of items of respective individual product types arriving with a certain weight distribution, but it is it novel contribution to propose that even different types of articles can be merged into the same batches in a well controlled manner.

Thus, already with a batcher as disclosed in the said GB 2,116,732 it will be perfectly possible to effect co-batching of e.g. different types of chicken pieces, provided the control system is geared to distinguish between the different types. If the pieces of the respective different types are of marked different weight ranges, then it is obviously only a matter of calling for the weighing station or its computer to effect "type recognition". If the weights of the different types are more or less overlapping, the associated problem has already long ago been solved in connection with pure sorting machines of basically the same layout as the grader according to said GB 2,116,732, viz. in prescribing that items of different types should, inletwise, be placed at respective dedicated positions of the feeder conveyor, such that the sorter control unit (without any weighing or recognition station) will nevertheless keep account of the kind of items arriving to the sorter line.

Once this is ensured in connection with a grader line with an associated weighing unit it will, on the level of principle, be very easy to program the control unit in such a manner that it will arrange for the desired merging of articles of different types and weights into common batches, according to prescribed conditions.

A very simple control model will be to specify, by way of example, that each bill should receive at first a predetermined number of items of a first type, up to a predetermined partial batch weight for that type of items, following which the process goes on with an addition to each partial batch of the required number of another type of items for the building up of an additional predetermined partial batch weight or target weight for items of this type, and so forth until the batch is finished. In practice, when the items of all types are supplied in mixed formation, the computer should be programmed such that different bins should receive respective different types of items, thus avoiding that all bins at a time will call for only the same type of items.

With the above control model, acceptable small overweights of the individual partial batches will be summed up in each final batch, thus possibly amounting to a less acceptable total overweight. On the other hand, this model implies that the items of the different types should not be allocated to the individual bins in any predetermined sequence pattern, as the computer can easily handle the job of merging respective types of items to respective partial target weights even if the items are allocated in mixed order.

One way of reducing such a possible overweight will be to arrange for the computer to effect a compensation adjustment for the target weight of one or more following partial batches in response to one or more preceding partial batch or batches already having amounted to a noticeable overweight, or, for that sake, an acceptable 'partial underweight'. Thus, during the building up of the batches it is possible to operate with appreciable tolerances for the target weights of the respective different types of items, whereby the batching may be greatly facilitated.

Ideally, of course, the different types of items should be allocated to the individual bins in respective sequential series, again in such a manner that normally there will always be bins calling for mutually different types of items. The sequence pattern for the individual bins should not necessarily be predetermined, inasfar as the computer may well be programmed to make coordinated decisions with respect to choice of "new type" for the individual bins, specifically with the purpose of smoothening out the demands for the different types so as to keep the general batching capacity high.

It is a further possibility to effect batching control based on combinatoric calculations with the aim of arriving at the desired target weight (weight range, weight distribution) for the full batches, without defining specific partial target weights for the individual types of items, though still with the required numbers of items of the respective types. To illustrate this, FIG. 12 indicates a calculation model for the determination of "best choice" in allocating items to a selected bin when the same is missing 4, 3, 2 and 1 items or item, respectively, in order to build up therein a batch of 2×2 items of two different types A and B. In connection with a natural weight distribution of the respective two types an ideal choice of the batch target weight, M, should be the double sum of the average weights of the items of the respective types, or a well defined target range across or adjacent to this sum weight.

Figure 12:
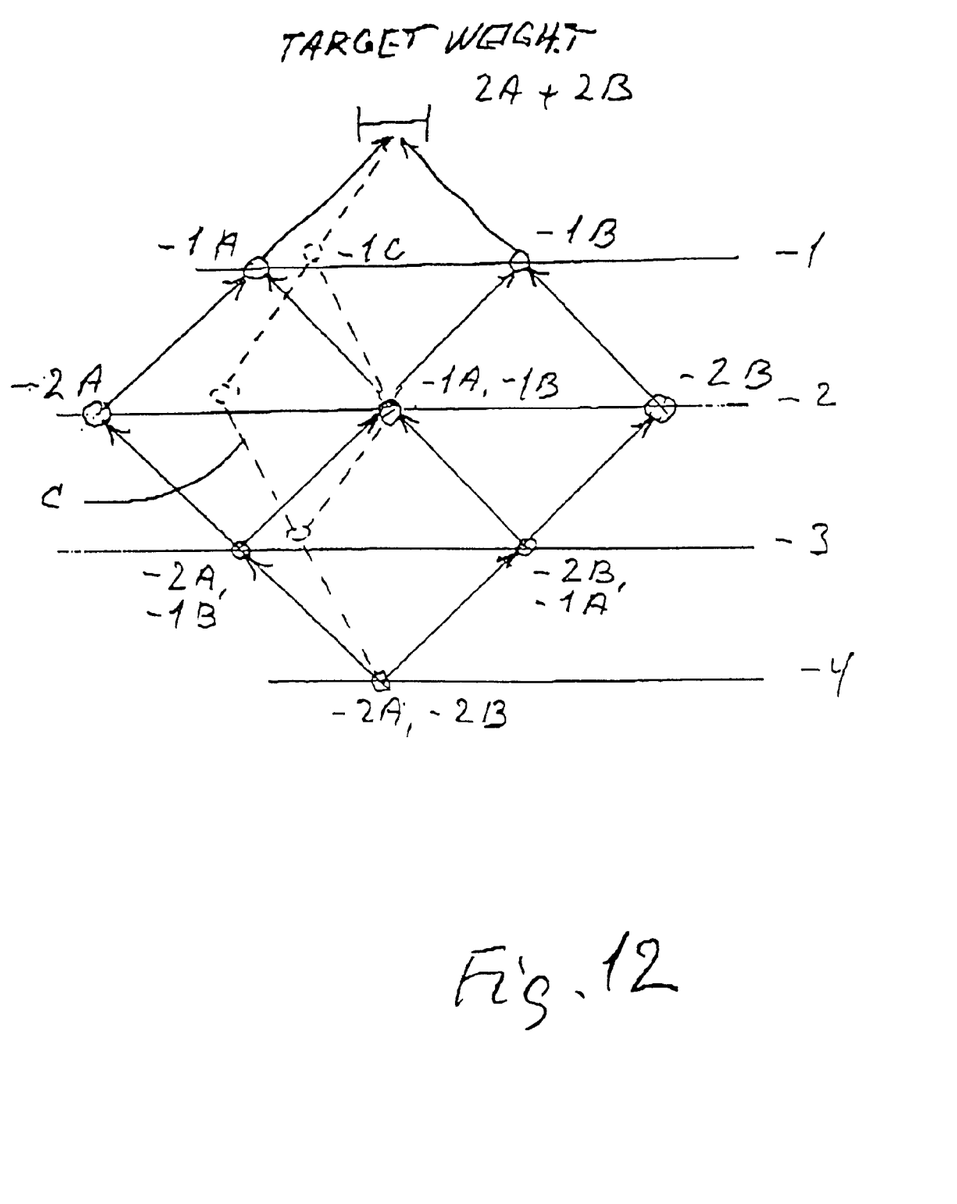
FIG. 12 is a diagram illustrating relevant calculations.

When a given bin it missing 1 item as represented by the line 1 in FIG. 12 it will of course be either an A- or a B-item, and since it has previously been endeavoured to provide for a partial batch missing just one such item exhibiting the average weight of the relevant respective distribution (A or B), then such a weighed-in item will soon be localized and allocated to this bin for completing the batch therein. When 2 items are missing, cf. line 2, these will be either 2 A-items, 2 B-items or 1A- and 1 B-item, i.e. there will be three options. The computer, knowing the available and expectable item types and weights according to the respective weight distributions and also knowing the weights of the collected items in all of the bins missing two items, will then decide "best choice" for any new item to be allocated to such a bin which, when thereafter missing one item in stage 1, will have the better likelihood of being built up to the target weight M. It will be understood that the required two items can be selected, each, within relatively broader weight ranges, inasfar as they should only fulfil the condition that the sum of their weights should build up the partial batch weight of the items in the selected bin to the point or narrow range, from which the batch can be completed by one item from the average weight range of the items of either type A or type B.

When 3 items are missing (line 3), such items will be either one A-item plus two B-items or one B-item plus two A-items, i.e. now with still more combination options that will satisfy the conditions for the building up of the relevant partial batches to the stage in which they miss but two items. Here again the individual items can be selected from a still broader weight range of the respective item types, when only the sum of weight of the three items is sufficient to satisfy the conditions of stage 2.

In step 4, which will be the first step of the building up of a batch in any bin just requiring a first item, it will at least in principle be possible to select freely from the two types of items and from the entire weight range of the respective distributions, confiding in the possibility of thereafter, in stage 3, further building up the partial batch weight to satisfy the conditions of that stage.

It should be considered, however, that it will not always be possible to exploit all of the items of a given distribution, in particular because a selection of a first item from either end of the spread of the distribution may make it practically impossible to thereafter arrive at a predetermined target weight. In such cases it will be a preferred possibility to sort out or neglect all of these extreme items, which are relatively few in numbers and then accept that the effective weight range of the distribution is correspondingly restricted.

In FIG. 12, the course of sequence of the required calculations is illustrated in full lines in two dimensions only, linked with the handling of but two different types of items, each exhibiting individual weight distributions. If items of three different types are involved, the same calculations can be extended to comprise even the presence of "C type items" in a third dimension as shown in dotted lines, and if still further types are added it will thus be adequate to speak of calculations in a "multidimensional space".

In an analogous manner it will be possible to effect the calculations based on probability considerations as according to FIGS. 7–11, now with registrations of separate histograms for the weight distribution of the respective different types of items. Also in this connection, any of the calculation models discussed above can be selected.

Some co-batching jobs may be connected with special conditions to be observed. Thus, for the batching of different chicken parts in pairs it may be set as a condition or at least a preference that the parts in any pair should be of reasonable uniform weight, i.e. originating from the same relatively narrow weight range, in order to look "natural". Generally, the customers will not find it particularly remarkable if, in a packing with 2×4 chicken parts, the respective pairs of parts originate from chickens of pronounced different weight classes, when only the parts of the individual pairs are reasonably alike, and the grader system, therefore, will still have good possibilities to merge items so as to form pairs or even larger numbers of items with substantially equal weights and yet arrive at batching results with acceptable tolerances out from a wide weight range of the respective types of items.

In the foregoing it has been assumed that the overall goal is to make up batches holding a predetermined number of items amounting to predetermined target weights (weight ranges, weight distributions). It is a still further aspect of the invention, however, that while it is still desirable to work with one or more predetermined target weights, it will be practiceable to renounce the requirement as to the predetermined number of items in the batches. It has been found that with the aid of modern signal analysis equipment, whether operating in real time or in high speed simulation mode, it will be possible for the batching computer to recommend, generally or periodically, to build up all or some batches with another number of items in order to reach the target weight more economically (small give-away overweight, small rage of recycling of unplaceable items). Such a recommendation can be conveyed to a batching operator, who will then decide whether the recommendation should be followed, perhaps in view of other conditions, or the computer may be set to simply institute switches between different numbers of items in all or some of the batches whenever this is found appropriate and permissible In connection with co-batching of items of different types such shifts may effected individually for each type of items.

The general picture of the co-batching of items of different types as given so far is that the items of each batch are all allocated to the same receiver, in which the complete batch is built up. It is another possibility, however, that the items of each batch be allocated to two or more receivers, though still being batched to one target weight. The partial batches in the different receivers can then be merged to form the full batch. This can be practised when it is desired to produce batches larger than the receiving capacity of each of the receivers, but a special possibility will be to effect separate collection of the respective different types of items, which may then, in the complete batch, be present as respective individual groups, e.g. packed in individual bags, though in common still representing one full batch measured out to one total target weight. This will be an advantageous option in connection with so-called catering packings of chicken parts, where it is often desirable to keep the different types of parts separated from each other.

It will be appreciated that in connection with the invention it will be possible to set up a long row of different batching conditions, relating to fixed or variable numbers of each or some of the respective types of items in each batch or in respective different batches;

fixed or variable target weight of each type of the respective items in each batch, including fixed target weights for one or more types and variable target weight for one or more other types;

different batching conditions for respective individual receivers or bins, including selection of different combinations of respective types of items;

fixed or variable batch weight with fixed or variable target weight or numbers of respective types of items.

While a grader machine will normally have a plurality of receiver bins it will, at least in principle, be possible to use but a single bin for a specific batching job, whilst the other bins are used for one or more other jobs. Such a "single bin" should not necessarily be one particular bin, but rather "one bin at a time"; at the outlet from the grader it will be immaterial from which bin a given batch originates, if only the control unit provides an identification signal linking the discharged batch with the relevant job, e.g. by an associated order number.

It should be mentioned that the term 'target weight' as used herein, although nominally being a specific weight, may well be defined with tolerances as relevant for the user or for the particular job.

What is claimed is:

1. A method for determining the probability for filling at least one batch with at least one item having at least one characteristic property and for assigning an item to the at least one batch based upon the best choice probability determined from the at least one characteristic property, the method comprising:

providing a first set of data representing at least one characteristic property of at least one item;

providing a second set of data representing the fill-up requirement of at least one batch;

generating a third set of data representing a table of the number of combinations of the at least one item represented in the first set of data as a function of the fill-up requirement and the item count;

providing a fourth set of data indicating at least one fill-up requirement;

generating the probability for filling the at least one batch with at least one item relative to the fill-up requirements from the fourth set of data based upon the best choice determined from the third set of data representing a table of the number of combinations of the at least one item represented in the first set of data, and effecting assignment of the at least one item to a respective batch as determined from the best choice probability generated.

2. A method for determining the probability according to claim 1, wherein at least one entry of the first set of data is removed and/or at least one entry is added to the first set of data when an item has been assigned in a process of assigning at least one item to at least one batch of items.

3. A method for determining the probability for filling a batch according to claim 1, wherein the first set of data is organized as a first in first out queue of entries, the queue has accordingly a first and a last entry and the last entry of this queue represents an item most recently applied in a process of assigning an item to a batch of items.

4. A method for determining the probability according to claim 1, wherein the number of entries of the first set of data is selected so that fluctuations in the probability due to removal and/or addition of entries to the first set of data is lower than a predetermined limit and so that the prospect will be able to follow a general change in population of items.

5. A method for determining the probability for filling a batch according to claim 1, wherein the number of entries of the first set of data is from 50–500.

6. A method for determining the probability for filling a batch according to claim 1, wherein the third set of data is updated substantially each time an item is assigned to a batch.

7. A method for determining the probability for filling a batch according to claim 1, wherein one entry of the first set of data is removed and one entry is added to the first set of data substantially each time an item is assigned to a batch.

8. A method for determining the probability for filling a batch according to claim 7, wherein the third set of data is updated periodically each time a substantial change in the distribution of characteristic properties of the items represented in the first set of data occur.

* * * * *